United States Patent [19]
Bidese et al.

[11] Patent Number: 5,463,680
[45] Date of Patent: Oct. 31, 1995

[54] SWITCHING ARRANGEMENT FOR ACTIVATING ELECTRICAL DEVICES

[75] Inventors: Werner Bidese, Zurich; Hans-Rudolf Fritschi, Wil; Alfred Grau, Zurich, all of Switzerland

[73] Assignee: Siemens-Albis AG, Zurich, Switzerland

[21] Appl. No.: 196,474

[22] Filed: Feb. 15, 1994

[30] Foreign Application Priority Data

Feb. 16, 1993 [CH] Switzerland ............ 00474/93

[51] Int. Cl.⁶ ................. H04M 11/00; H04M 1/00
[52] U.S. Cl. ............. 379/165; 379/102; 379/104; 379/105; 379/162; 379/163
[58] Field of Search ............... 379/102, 104, 379/105, 162, 163, 165

[56] References Cited

U.S. PATENT DOCUMENTS

| | | | |
|---|---|---|---|
| 4,020,289 | 4/1977 | Anderson | 179/15 |
| 4,353,502 | 10/1982 | Myers | 379/104 |
| 4,491,690 | 1/1985 | Daley | 379/102 |
| 4,536,617 | 8/1985 | Perry | 379/102 |
| 4,578,540 | 3/1986 | Borg | 379/102 |
| 4,625,080 | 11/1986 | Scott | 379/104 |
| 4,748,654 | 5/1988 | Gray | 379/105 |
| 4,841,562 | 6/1989 | Lem | 379/104 |
| 4,845,773 | 7/1989 | Attallah | 379/102 |
| 4,885,766 | 12/1989 | Yasuoka | 379/105 |
| 4,899,370 | 2/1990 | Kameo | 379/102 |
| 4,958,370 | 9/1990 | Shimanuki | 379/157 |
| 5,051,720 | 9/1991 | Kittirutsunetorn | 379/105 |
| 5,086,458 | 2/1992 | Bowen | 379/105 |
| 5,119,412 | 6/1992 | Attallah | 379/104 |
| 5,127,045 | 6/1992 | Gragun | 379/105 |
| 5,128,987 | 7/1992 | McDonough | 379/102 |

FOREIGN PATENT DOCUMENTS

| | | |
|---|---|---|
| 0361350 | 4/1990 | European Pat. Off. . |
| 2039698 | 9/1980 | United Kingdom . |
| 841481 | 4/1984 | WIPO . |

Primary Examiner—Stephen Chin
Assistant Examiner—Vijay Shankar
Attorney, Agent, or Firm—Sandler, Greenblum & Greenblum

[57] ABSTRACT

A switching arrangement for activating a plurality of electrical devices connected to a communication line. The switching arrangement monitors the communication line for the reception of activation signals, and also transmits activation signals to the communication line. The switching arrangement activates an electrical device (from the plurality of electrical devices) connected to the communication line, in response to the detection of the an activation signal, to shift the electrical device from a dormant state (in which electrical consumption by the electrical device is minimized) to a normal, functional operational state (in which a maximum electrical consumption of the electrical device occurs) only when the electrical device is actually being operated. By switching the electrical device between a dormant state and an operational state, the amount of electrical power required to operate the plurality of electrical devices is reduced.

15 Claims, 2 Drawing Sheets

SWITCHING ARRANGEMENT FOR ACTIVATING ELECTRICAL DEVICES

CROSS REFERENCE TO RELATED APPLICATIONS

This application claims the priority of Swiss Application No.00 474/93-7, filed 16 Feb. 1993, the disclosure of which is incorporated herein by reference in its entirety.

BACKGROUND OF THE INVENTION

1. Field of the Invention

This invention pertains to a switching arrangement for operating electrical devices wherein a switching arrangement and the noted devices are connected with each other via a communication line.

2. Discussion of the Background of the Invention and Material Information

Electrical devices in the communications field or in additional fields of application are utilized in daily operation often for only short time periods. Nevertheless, these devices normally remain in an uninterrupted functional state, thus wasting valuable energy. Particularly in battery operated devices this loss of energy is particularly disadvantageous. European patent document EP-OS 0 417 425 describes a telephone network which includes several subscriber stations or terminal devices which can be quickly activated and inactivated as well as being connectable onto further networks.

It is also known from European patent document EP-OS 0 417 542 that terminal devices can, at desired locations, be inductively coupled onto a two wire conductor. For such flexible networks with selectively coupleable terminal devices, in order to maintain the mobility thereof, preferably current sources comprised of batteries are provided. In case the terminal units, which in the customary manner are constantly in a functional state, this results in a short life span of the batteries, increased interruptions in the telephone network and thus leads to increased operating costs. European patent document EP-OS 0 361 350 pertains to a mobile telephone station which is connected with a base station and also includes an energy saving circuit, whose transmitting unit, during the so-called stand-by-mode, or in its dormant state is shut off, in order to reduce the power requirements of the telephone station. Via a control signal, transmitted from the base station, the telephone station is again activated, upon demand. The control signal is subdivided into differing areas, via which the telephone station is brought to stand-by and in any case is induced to send out a confirmation signal.

The disadvantage of this energy saving circuit is that for the monitoring of the control signal, with the exception of the sending unit, practically all significant circuit blocks of the telephone station have to be in their normal operating mode. Particularly, the reception and control portions are required for the detection of the coded control signals. In addition, the energy saving circuit is only usable in case the predetermined transfer channel between the base station and telephone channel does not have to carry additional useful signals or interfering signals.

SUMMARY OF THE INVENTION

It is an object or goal of the present invention to produce a switching circuit via which the terminal devices can be operated in such a manner that in the dormant state thereof they have a minimal power requirement.

This is accomplished via a switching arrangement for activating electrical devices wherein the switching arrangement and the devices are connected with each other via a communication line, the switching arrangement comprising a comparator, the comparator being adapted to be supplied, on the one hand, with the signals carried by the communications line, and on the other hand, with a first reference voltage; an electric control unit, with an output of the comparator being connected with the electronic control unit; the electronic control unit being adapted for activating one of the devices into one of partial and complete operation; at least one of the devices including a transmitter stage, with the transmitter stage being connected with the communication line; and the activating signals being releasable to the communications line via the transmitter stage.

In a further embodiment of this invention, a filter stage, operatively located upstream of the comparator, with the filter stage passing low frequency activation signals but blocking higher frequency interfering signals or useful signals being transmitted via the communication line.

In another embodiment of this invention, a control loop, operatively located upstream of the comparator or a filter stage, the control loop governing input signals to the value of a second reference voltage and selecting the time constants of the control loop in such a manner so that the activation signals are transferred in a substantially unimpaired manner.

In yet a further embodiment of this invention, the control loop is comprised of a controllable pre-selection stage; a connected conversion stage, with the conversion stage in turn being connected with a local oscillator; a connected intermediate frequency filter as well as a controllable intermediate frequency amplifier stage; a connected rectifier stage and a control stage; an input of the control stage being connected with the output of the rectifier stage; and an output of the control stage being connected with control inputs of the pre-selection stage and the intermediate frequency amplifier stage.

In yet another embodiment of this invention, a portion of the communication line takes the form of the primary winding of a transformer; a first secondary winding of the transformer being connected with an amplifier stage via a switch; a second secondary winding of the transformer being connected with an input stage via an additional switch; the amplifier stage and the input stage being connected with the pre-selection stage via a transfer switch; and the switch, the additional switch and the transfer switch being connected with an electronic control unit.

By means of the switching arrangement of this invention it is assured that terminal devices are only activated during the time they are actually utilized by the user. For the remainder of the time, the terminal devices are switched into a dormant state or into a functional state, in which the supply sources are practically not encumbered at all or only to such an extent that they can again be activated at any time. The lifespan of the commonly used batteries is thereby increased considerably. The mean supply requirement of a network is thus correspondingly strongly reduced. In addition, the switching arrangement of this invention permits the sending of an activation signal, via a communication line to the terminal devices, which, in instances, are already provided by other supply sources, with noise components or useful signals. This guarantees that the terminal units only react to an activation signal and not to additional useful or interfering signals.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
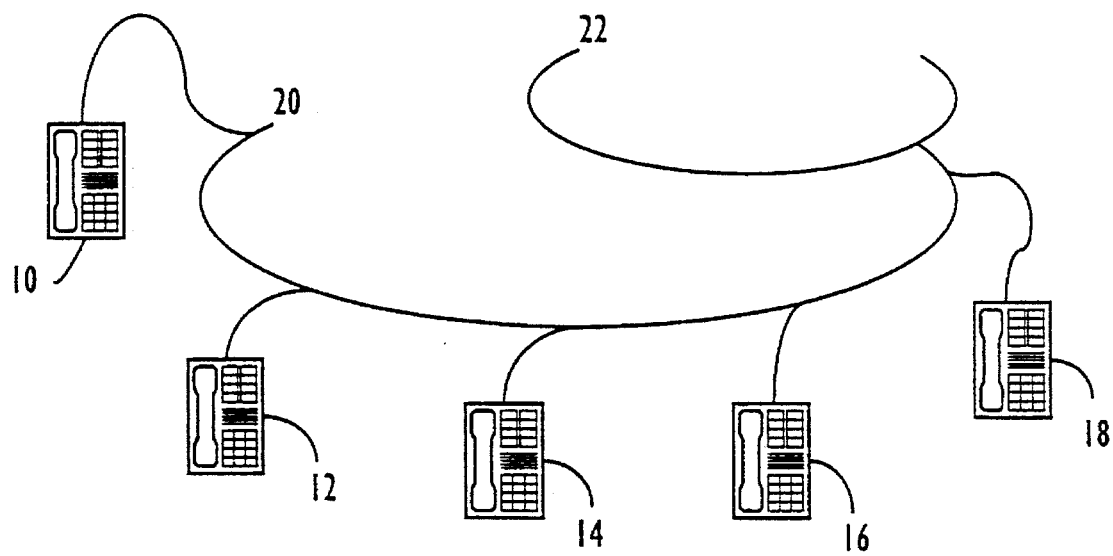
FIG. 1 shows a plurality of terminal devices connected together with a communication line.

FIG. 1 shows several terminal devices 10, 12, 14, 16 and 18 utilized in the communications field which are connected together via a communication line 20. In addition, communication line 20 is connected, via another communication line 22, with a further communications network. If, for example, a communication is to be set up between two terminal devices 12 and 18, a first step initiated by the user who initiates the call, e.g. via the actuation of a contact in terminal device 12, switches the latter from a dormant state into a normal functional state. In the dormant state, only those circuit blocks are supplied with current that are required for the reactivation of a terminal device.

For example, in its dormant state, the transmitting unit in each terminal device 10, 12, 14, 16 and 18 is separated from the associated power supply. Therefore, in the normally predominating dormant state, only a fraction of the performance, which must be expended during the normal functional state, is required. In a further step, after the activating of the call-initiating terminal device 12, for example, via the input of the calling number, an activation or prompt signal is sent to all other terminal devices 10, 14, 16, and 18, whereupon these, in case they are not already activated, are also switched to the normal functional state. In addition, a calling signal with a code number is sent to all terminal units 10, 14, 16 and 18 and a connection is established with desired terminal unit 18 corresponding with the code number. Terminal units 10, 14 and 16, which after receipt of the activation signal are not supplied with the corresponding code number, are, after a relatively short time span, again automatically switched back to the dormant state.

Upon the cessation of the connection, terminal devices 12 and 18 are also switched back into the dormant state. Naturally, in the same manner, other desired devices, such as for example measurement or monitoring devices, connected via a communication line 24, can be selectively activated and switched.

Figure 2:
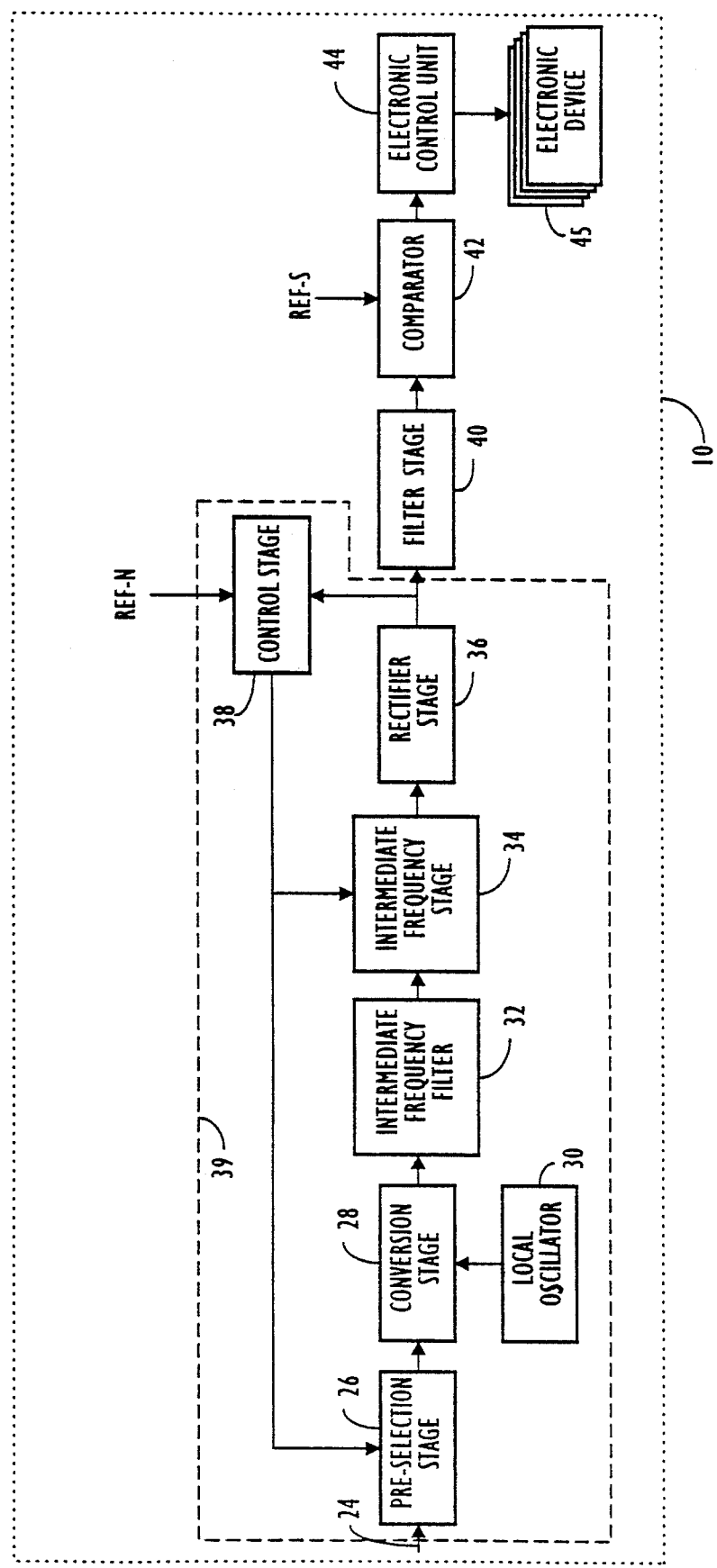
FIG. 2 shows the switching arrangement of this invention, as utilized in the terminal devices, for the detection of activation signals.

The switching arrangement of this invention, shown in FIG. 2, which is preferably provided in each terminal device (such as, for example, terminal device 10), includes a pre-selection stage 26 which is connected with a conversion stage 28, which in turn is connected with a local oscillator 30, and via two intermediate frequency stages 32 and 34, with a rectifier stage 36. The output of the rectifier stage 36, is on the one hand connected with a control stage 38, and on the other hand with a comparator 42, via a filter stage 40, with the output signal of comparator 42 being supplied to an electronic control unit 44. The arrangement of the pre-selection stage 26, conversion stage 28, local oscillator 30, intermediate frequency filter 32, intermediate frequency stage 34, rectifier stage 36 and control stage 38 form a control loop 39. Reference voltages ref-n and ref-s are supplied to control stage 38 and comparator 42, respectively.

The switching arrangement functions in the following manner: The input signal, which contains temporary, for example, pulse-shaped activation signals with a length of 500 ms and a frequency of 35,440 Hertz, is advanced to pre-selection stage 26 and therein filtered, via a band-pass filter for example, and preferably amplified in a controllable amplifier. By means of the pre-selection stage 26, the input signal is thus freed of a portion of the interfering signal and noise components. The quality or grade of the band-pass filters in pre-selection stage 26 can be kept low since an additional small band filter step 32 is provided in the connecting intermediate frequency stage. The signal emanating from pre-selection stage 26 and local oscillator 30, which has a local oscillator frequency of 35,234 Hertz, are fed each to an input of conversion stage 28 where output signal is then filtered in intermediate frequency stage 32. In intermediate frequency stage 32, which is provided with a band-filter of a band width about 40 Hertz, a merge program of 206 Hertz, formed in conversion stage 28, is filtered out. Interfering signal portions, which are outside the band width of the band filter are thus largely suppressed in rectifier stage 36 via the preferably controllable signal directed to intermediate frequency amplifier 34.

The effect of interfering signal portions, contained within the band width of the band filter, is neutralized via the circuit technology measure to be described hereinafter. The signal emanating from rectifier stage 36 is sent, for this reason, to control stage 38 whose outputs are connected with the control inputs of the amplifiers contained in pre-selection stage 26 and in intermediate frequency stage 34. The voltage emanating from rectifier stage 36 is regulated in control stage 38, via the control of the amplifiers in pre-selection stage 26 and in the intermediate frequency stage 34, to a value which corresponds to that of the reference value. Pulse-shaped activation signals, via the steps 26, 28, 32 and 36, thus at any one time arrive at comparator 42.

Noise components, on the other hand, whose intensities only change slowly, are always set to the value of the reference voltage. Through this control it is avoided that noise components and line interferences that do not change erratically, cross the predetermined threshold value in comparator 42 and can be detected as activation signals. The voltage present at the output of rectifier step 36, is however possibly superimposed with relatively short impulses, which are not detected by the control system. Within comparator 42 the signal emanating from rectifier stage 36 is compared with a reference voltage ref-s. As soon as the value of this voltage is exceeded, the comparator 42 detects an activation signal. Strong interfering signals, whose extent is shorter than the extent of the activation signals (for example <50% or <250 ms) are therein preferably suppressed. The difference between the reference voltages ref-n and ref-s thus corresponds to the measure which the activation signals, superimposed over the noise component or the line interference, must exceed in order to be detected as such.

Ahead or upstream of comparator 42 an additional filter stage 40 is provided, via which short impulse peaks and impulses of shorter impulse duration are suppressed. Signals with shorter impulse duration, which are transmitted between additional terminal devices connected with the communication line, thus cannot effect the activation of additional terminal units. After the detection of an activation signal all other portions of the terminal unit are connected with the current supply and brought to a functional state. The terminal unit is checked in a short time span, via additional known circuit blocks, if the predetermined code for the terminal unit has arrived and if the connection to a subscriber should be set up. In case the code belonging to the terminal unit does not arrive, the terminal unit is switched back into the dormant state after a short time span. The detecting activation signal is thus preferably supplied to the electronic control unit 44, which for example, is qualified for the switching on and off of the current supply to additional circuit units (electronic devices) 45, such as, for example, a transmitter.

Figure 3:
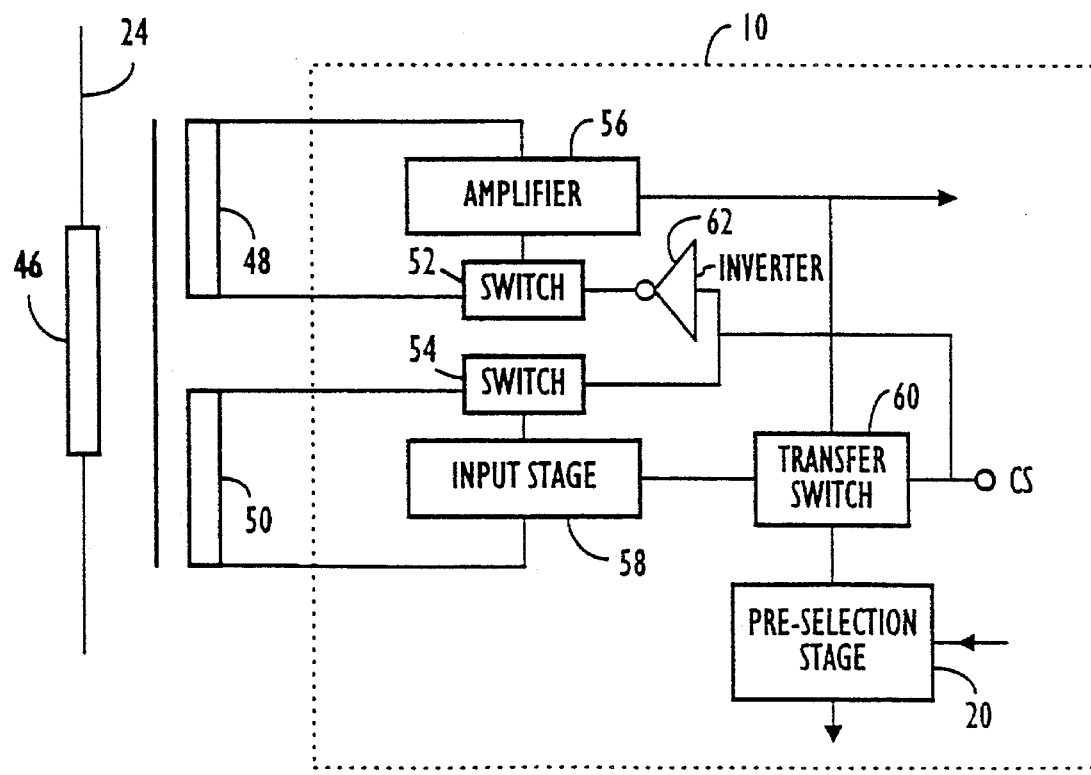
FIG. 3 shows a switching arrangement for the inductive coupling, of the switching arrangement of FIG. 2, onto a communication line.

FIG. 3 shows switching arrangement in which terminal device 10 is inductively coupled to a communication line 24. Preferably a winding of communication line 24 forms the primary winding 46 of a transformer, whose two secondary windings 48, 50, are connected, via a switch 52 or 54 with an amplifier stage 56 or an input stage 58. Stages 56 and 58 are additionally also alternatively connected, via a transfer switch 60, with the pre-selection stage 26, which is also shown in FIG. 2. In addition, transfer switch 60, switch 54 directly, and switch 52 via an inverter 62, are connected with a control line which adjoins a control signal cs. The advantages of inductive coupling are known from EP-OS 0 417 25 and EP-OS 0 417 542.

Of course this invention is not limited to this type of coupling, but is also useable, for example, with galvanic or optical couplings. In the dormant state of the terminal device, the signal induced in secondary winding 50, is fed, via an input stage 58, which preferably includes a circuit for protecting against excess voltage, and transfer switch 60, to pre-selection stage 26. In the dormant state, control signal cs thus closes switch 54, opens switch 52 via inverter 62, and sets transfer switch 60 in such a manner that input stage 58 is connected with pre-selection stage 26 and that amplifier stage 56 is separated from input stage 58.

Thus it is accomplished, that the signal occurring on the primary side is fully transferred to the secondary winding 50 and that thus a maximum voltage occurs there. In the dormant state, as already previously described, all circuit blocks, which are not required for the activation of terminal unit 10, are separated from the current supply. For example, the amplifier stage 56, which is not required in the dormant state is switched off. After the activation of the terminal device, switches 52, 54 and 60 are switched, thereby opening secondary winding 50 and connecting secondary winding 48 with the input of amplifier stage 56. The output signal of amplifier stage 56 is connected on the one hand, via transfer switch 60 of pre-selection stage 26, and on the other hand to a further stage for the continued subsequent treatment of this signal. Although the terminal device 10 is already activated, the activation switching shown in FIG. 2 remains active in order to further regulate the signal fed to comparator 42 to a constant value corresponding with that of reference voltage ref-n.

This guarantees that the signal supplied to the comparator, not only in the dormant state of the terminal device, but also during the normal functional state is always regulated at a constant value corresponding with that of reference voltage ref-n. This, for example, avoids that the noise component exceeds the threshold value corresponding to that of reference voltage ref-s in comparator COMP via which, during the change-over into the dormant state, again but erroneously, an activation signal would be detected and terminal device 10 would again be activated.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A switching arrangement for activating an electrical device, said switching arrangement comprising:

a comparator that compares an activation signal received on a communication line with a first reference voltage;

an electronic control unit, an output of said comparator being connected to said electronic control unit, said electronic control unit activating at least one of a plurality of terminal devices in response to a predetermined output from said comparator, at least one of said plurality of terminal devices having a transmitter stage connected to said communication line to put said activation signal onto said communication line, said at least one of a plurality of terminal devices being deactivated upon the occurrence of a predetermined event; and a control loop connected to said comparator to govern input signals to a value of a second reference voltage and selecting time constants of said control loop in such a manner so that activation signals are transferred in a substantially unimpaired manner, wherein said control loop comprises:

a pre-selection stage;

a conversion stage connected to an output of said pre-selection stage;

a local oscillator that is connected to said conversion stage;

an intermediate frequency filter that is connected to an output of said conversion stage;

an intermediate frequency amplifier stage that is connected to an output of said intermediate frequency filter;

a rectifier stage connected to an output of said intermediate frequency amplifier stage; and a control stage that is connected with an output of said rectifier stage, an output of said control stage being connected with a control input of said pre-selection stage and a control input of said intermediate frequency amplifier stage.

2. A switching arrangement for activating an electrical device, said switching arrangement comprising:

a comparator that compares an activation signal received on a communication line with a first reference voltage;

an electronic control unit, an output of said comparator being connected to said electronic control unit, said electronic control unit activating at least one of a plurality of terminal devices in response to a predetermined output from said comparator, at least one of said plurality of terminal devices having a transmitter stage connected to said communication line to put said activation signal onto said communication line, said at least one of a plurality of terminal devices being deactivated upon the occurrence of a predetermined event;

a filter stage connected to an input of said comparator that passes a low frequency activation signal but blocks at least one of higher frequency interfering signals and noise signals transmitted via said communication line; and a control loop connected to said filter stage to govern input signals to a value of a second reference voltage and selecting time constants of a control loop in such a manner so that activation signals are transferred in a substantially unimpaired manner, wherein said control loop comprises:

a pre-selection stage;

a conversion stage connected to an output of said pre-selection stage;

a local oscillator that is connected to said conversion stage;

an intermediate frequency filter that is connected to an output of said conversion stage;

an intermediate frequency amplifier stage that is connected to an output of said intermediate frequency filter;

a rectifier stage connected to an output of said intermediate frequency amplifier stage; and a control stage that is connected with an output of said rectifier stage, an output of said control stage being connected with a control input of said pre-selection stage and a control input of said intermediate frequency amplifier stage.

3. The switching arrangement of claim 1, further comprising:

a transformer, wherein a portion of said communication line forms a primary winding of said transformer, a first secondary winding of said transformer being connected to an amplifier stage via a switch, a second secondary winding of said transformer being connected to an input stage via an additional switch, said amplifier stage and said input stage being connected with said pre-selection stage via a transfer switch, said switch, said additional switch and said transfer switch being connected to said electronic control unit.

4. The switching arrangement of claim 2, further comprising:

a transformer, wherein a portion of said communication line forms a primary winding of said transformer, a first secondary winding of said transformer being connected to an amplifier stage via a switch, a second secondary winding of said transformer being connected to an input stage via an additional switch, said amplifier stage and said input stage being connected with said pre-selection stage via a transfer switch, said switch, said additional switch and said transfer switch being connected to said electronic control unit.

5. A switching arrangement for selectively activating and deactivating an electrical device interfaced to a communication line, said switching arrangement comprising:

means for comparing a signal transmitted by a terminal device connected to said communication line with a reference voltage;

means for activating each one of a plurality of terminal devices in response to a predetermined result of a comparison by said comparing means;

means, associated with each one of said plurality of terminal devices, for detecting a predetermined code transmitted by said terminal device;

means for establishing a communication link between said terminal device and another terminal device that is assigned said predetermined code transmitted by said terminal device;

means for deactivating all of said plurality of terminal devices that are not associated with said predetermined code;

a control loop connected to said comparing means to process said signal transmitted by said terminal device to ensure that said transmitted signal is inputted to said comparing means in a substantially unimpaired manner, wherein said control loop comprises:

a pre-selection stage;

a conversion stage that receives an output of said pre-selection stage;

a local oscillator that receives an output of said conversion stage;

an intermediate frequency filter that receives an output signal of said conversion stage;

an intermediate frequency amplifier stage that receives an output signal of said intermediate frequency filter;

a rectifier stage that receives an output of said intermediate frequency amplifier stage; and a control stage that receives an output of said rectifier stage, an output of said control stage being connected to a control input of said pre-selection stage and a control input of said intermediate frequency amplifier stage.

6. The switching arrangement of claim 5, further comprising means for eliminating at least one of an interfering signal and a noise signal from said signal transmitted by said terminal device.

7. The switching arrangement of claim 5, wherein an electrical power requirement of said terminal device is minimized when said terminal device is not activated.

8. The switching device of claim 5, further comprising inductively coupling said plurality of terminal devices to said communication line.

9. The switching arrangement of claim 5, further comprising means for controlling an electronic device in response to said establishing means establishing a communication link.

10. The switching arrangement of claim 1, wherein an output of said electronic control unit is connected to an electronic device.

11. The switching arrangement of claim 1, wherein said predetermined event comprises a failure to establish a communication link between at least two of said plurality of terminal devices.

12. The switching arrangement of claim 1, wherein said predetermined event comprises a termination of a communication link between at least two of said plurality of terminal devices.

13. The switching arrangement of claim 2, wherein an output of said electronic control unit is connected to an electronic device.

14. The switching arrangement of claim 2, wherein said predetermined event comprises a failure to establish a communication link between at least two of said plurality of terminal devices.

15. The switching arrangement of claim 2, wherein said predetermined event comprises a termination of a communication link between at least two of said plurality of terminal devices.

* * * * *